(12) United States Patent
Griffin

(10) Patent No.: US 7,039,139 B1
(45) Date of Patent: May 2, 2006

(54) SYSTEM FOR INCREASING DIGITAL DATA DEMODULATOR SYNCHRONIZATION TIMING RESOLUTION USING TRAINING SEQUENCE CORRELATION VALUES

(75) Inventor: Grant R. Griffin, Overland Park, KS (US)

(73) Assignee: Honeywell International Inc., Morristown, NJ (US)

( * ) Notice: Subject to any disclaimer, the term of this patent is extended or adjusted under 35 U.S.C. 154(b) by 953 days.

(21) Appl. No.: 09/618,645

(22) Filed: Jul. 18, 2000

Related U.S. Application Data

(60) Provisional application No. 60/144,888, filed on Jul. 21, 1999.

(51) Int. Cl.
*H04L 7/00* (2006.01)

(52) U.S. Cl. ............... 375/355; 375/326; 375/362; 375/364; 342/357.12; 708/5

(58) Field of Classification Search ............... 375/355, 375/130, 148–150, 238, 319, 326, 343, 362, 375/364; 342/3–7, 357.12; 701/120; 714/701; 708/5

See application file for complete search history.

(56) References Cited

U.S. PATENT DOCUMENTS 4,025,775 A * 5/1977 Beauvais et al. ............. 708/5
4,894,842 A * 1/1990 Broekhoven et al. ....... 375/150
5,798,726 A * 8/1998 Schuchman et al. .......... 342/37
5,943,369 A * 8/1999 Knutson et al. ............ 375/326
6,064,939 A * 5/2000 Nishida et al. ............. 701/120
6,208,291 B1 * 3/2001 Krasner ................ 342/357.12
6,304,619 B1 * 10/2001 Citta et al. .................. 375/343

FOREIGN PATENT DOCUMENTS

WO      WO 9810548 A2 *  3/1998

* cited by examiner

*Primary Examiner*—Khai Tran
*Assistant Examiner*—Edith Chang
(74) *Attorney, Agent, or Firm*—Andrew A. Abeyta

(57) ABSTRACT

A demodulator for demodulating digital data includes a receiver for receiving a digital data signal, a determining device to determine if a fractional sample delay added to a demodulator's symbol sampling timing would improve synchronization timing, an implementing device implementing the fractional sample delay if the determining device determines that a fractional sample delay would improve the demodulation synchronization timing, and a demodulating device for demodulating the digital data signal. A method for demodulating digital data includes the steps of receiving a digital data signal, determining if a fractional sample delay added to a demodulator's symbol sampling timing would improve synchronization timing, implementing the fractional sample delay if it is determined in the determining step that a fractional sample delay would improve the demodulation synchronization timing, and demodulating the digital data signal.

43 Claims, 6 Drawing Sheets

SYSTEM FOR INCREASING DIGITAL DATA DEMODULATOR SYNCHRONIZATION TIMING RESOLUTION USING TRAINING SEQUENCE CORRELATION VALUES

CROSS-REFERENCE TO RELATED APPLICATION

This application claims the benefit of provisional application No. 60/144,888 filed Jul. 21, 1999.

BACKGROUND OF THE INVENTION

1. Field of the Invention

The present invention relates to a system for demodulating digital data. More particularly, the present invention improves the synchronization resolution timing for a class of digital data demodulators that use a training sequence, or preamble, to synchronize the demodulator's symbol sampling timing with the received signal's symbol timing. The system exploits the relationships among correlation values to determine if a fractional sample delay is to be inserted in the demodulator's symbol sampling timing. The system also determines how much of a fractional sample delay should be used, and then it implements the delay.

2. Description of the Related Art

When modulated data is transmitted and received, the timing of the transmitter and the receiver are arbitrary. The quality of the demodulated data is dependent upon the ability to synchronize the demodulator's symbol sampling timing with the symbol timing of the received signal. Intersymbol interference (ISI) occurs when the demodulator's symbol sampling timing is not perfectly aligned (synchronized) with the symbol timing of the received signal. This ISI results in errors in the demodulation process and reduces the quality of the demodulated data.

In certain known digital data demodulators, it is useful for the received data to contain a training sequence, or preamble, which "trains" the demodulator on the important characteristics of the signal. The training sequence increases the quality of the demodulation process by synchronizing the demodulator's symbol sampling timing with the received signal's symbol timing, thereby decreasing the effect of ISI. Therefore, demodulators are often implemented using a sampling rate of N signal samples per data symbol so that the demodulator's symbol sampling timing can be synchronized on any of the N samples. Thus, when the sample nearest to the ideal timing is chosen, the demodulation timing will always be accurate to within $+/-1/(2N)$ of a symbol period.

As larger values of N are used to increase the sampling rate, the timing resolution available increases, and the amount of ISI due to imperfect symbol sampling timing becomes negligible. However, as the sampling rate N is increased, the processing load also is increased, which generally increases the hardware requirements for performing the processing. Therefore, the designer must trade the increase in demodulator performance made possible by increasing the sampling rate N against the resulting increase in implementation complexity and cost.

There is a need, therefore, to provide a system capable of increasing the synchronization resolution timing without a corresponding increase in complexity and cost.

SUMMARY OF THE INVENTION

It is a general object of the present invention to provide a system for performing digital data demodulation that overcomes the disadvantages of the conventional methods.

It is another object of the present invention to provide a system for performing digital data demodulation that improves the synchronization timing resolution of a digital data demodulator to a fraction of a signal sample period, in order to increase the effective synchronization timing resolution without having to increase the sampling rate N.

The system of the present invention examines characteristics of the "correlation curve," a curve based on correlation values determined by correlating a reference training sequence with the received data at various sample-index offsets. The relationship between the values is then exploited to determine if a fractional sample delay is needed and to determine the amount of that fractional sample delay. The delay is then implemented using an interpolation algorithm.

In accordance with the objects described above, one aspect of the present invention relates to a demodulator for demodulating digital data. The demodulator includes a receiver for receiving a digital data signal, a determining device to determine if a fractional sample delay added to a demodulator's symbol sampling timing would improve synchronization timing, an implementing device implementing the fractional sample delay if the determining device determines that a fractional sample delay would improve the demodulation synchronization timing, and a demodulating device for demodulating the digital data signal.

In another aspect of the present invention, the determining device of the above demodulator includes an algorithm that exploits the geometry of a correlation curve to determine if a fractional sample delay would improve the demodulation synchronization timing.

In yet another aspect of the present invention, the algorithm of the above determining device includes comparing first and last correlation values of the correlation curve that exceed a threshold value, and in still another aspect of the present invention, the algorithm of the above determining device includes counting correlation values of the correlation curve that exceed a threshold value. In both of these aspects, the determining device may also further determine an amount of fractional sample delay necessary to improve the demodulation synchronization timing.

In still another aspect of the present invention, the implementing device of the above demodulator includes an interpolation filter that implements the fractional sample delay through the steps of (i) multiplying first and second samples of each pair of input samples by respective coefficients to obtain two fractional values, and (ii) summing the fractional values.

Another aspect of the present invention relates to a method for demodulating digital data. The method includes the steps of receiving a digital data signal, determining if a fractional sample delay added to a demodulator's symbol sampling timing would improve synchronization timing, implementing the fractional sample delay if it is determined in the determining step that a fractional sample delay would improve the demodulation synchronization timing, and demodulating the digital data signal.

According to yet another aspect of the present invention, the determining step of the above method includes an algorithm that determines if a fractional sample delay would improve the demodulation synchronization timing. The algorithm includes exploiting the geometry of a correlation curve and may compare first and last correlation values of the correlation curve that exceed a threshold value or may count correlation values of the correlation curve that exceed a threshold value.

According to another aspect of the present invention, the determining step of the above method may also include determining an amount of fractional sample delay necessary to improve the demodulation synchronization timing.

In yet another aspect of the present invention, the implementing step of the above method includes an interpolation filter that implements the fractional sample delay by performing the steps of (i) multiplying first and second samples of each pair of input samples by respective coefficients to obtain two fractional values, and (ii) summing the fractional values.

In another aspect of the present invention, a digital circuit is provided for implementing any of the methods discussed above.

In yet another aspect of the present invention, a processor is provided for implementing any of the methods discussed above.

Another aspect of the present invention relates to computer executable code for implementing a method for demodulating digital data. The computer executable code is for executing the steps of any of the methods discussed above.

In still another aspect of the present invention, a computer readable medium is provided for storing the computer executable code discussed above.

These and other aspects, objects, and features of the present invention will become apparent from the following detailed description of the preferred embodiments, read in conjunction with, and reference to, the accompanying drawings.

DETAILED DESCRIPTION OF THE PREFERRED EMBODIMENTS

Figure 1:
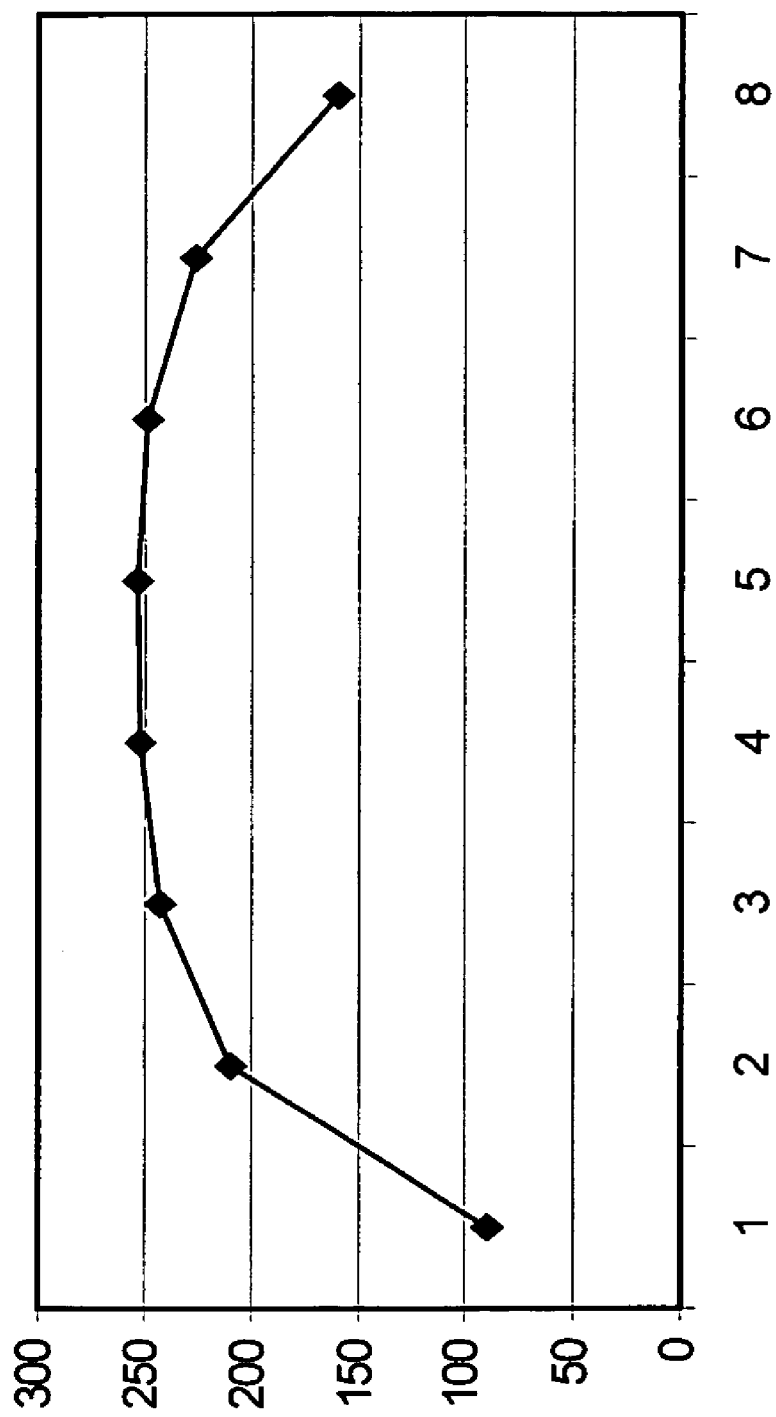
FIG. 1 is a graph showing a correlation curve for a perfectly aligned sampling having zero delay.

To reduce hardware costs, it is preferred to use the smallest sampling rate N that provides the needed amount of resolution. Therefore, it would be preferred to use a small sampling rate N if it is somehow possible to achieve the timing resolution equal to that of a larger N. To reduce the sampling rate N without reducing the resolution, a fractional sample delay is employed in the present invention. Such a fractional sample delay method has two elements: (1) a determination of whether a fractional sample delay is needed, and (2) an implementation of that fractional delay. The determination step also includes a determination of the amount of fractional sample delay. The present invention implements these two elements for digital data demodulators whose signals employ a training sequence.

One exemplary application for this system is in the demodulator of a VHF Digital Link (VDL) Mode 2 receiver. Using 8 samples per symbol (N=8), for example, the maximum timing error of ½ sample ($\frac{1}{16}$ of a symbol time) may degrade the error-rate performance of the system. However, if the signal can be selectively delayed by ½ sample (a fractional sample delay), then there is a maximum timing error of ¼ sample (½×½), which is equivalent to the resolution of a sampling rate of 16 samples per symbol (N=16). A timing error of ¼ sample ($\frac{1}{32}$ of a symbol) provides better quality and performance than the timing error of ½ sample. Therefore, in this example, only the implementation of either a zero or ½ fractional sample delay is required, depending on the actual timing of the incoming signal with respect to the demodulator's sampling clock.

The system according to the present invention consists of two basic elements: (1) a device, such as, for example, a processor executing software or a digital or analog circuit, to determine whether or not a fractional sample delay is needed, and (2) a device, such as, for example, a processor executing software or a digital or analog circuit, to implement the fractional sample delay.

Part 1, the determination step, of the system relies on the use of a "training sequence" (or preamble) in the transmitted signal. In the VDL Mode 2 application (as in many digital data signals), each transmission begins with a predefined training sequence that allows the receiver to (1) identify the signal as a valid VDL Mode 2 signal and (2) synchronize the demodulator's symbol sampling timing to the received signal's symbol timing.

To detect the training sequence of the received signal, incoming data samples are correlated with the 16 known VDL training sequence symbols to obtain correlation values that exceed a certain threshold. The threshold value is determined for each application to capture the resolution available on the slope of the correlation curve without introducing the noise associated with the correlation values at the extremes of the correlation curve. If the correlation process does not produce correlation values that are above the threshold value, then the demodulation process stops because the signal is too noisy (too weak) to be demodulated. The correlation process may be performed by a correlator device, i.e., hardware containing the circuitry for performing the correlation process.

Figure 2:
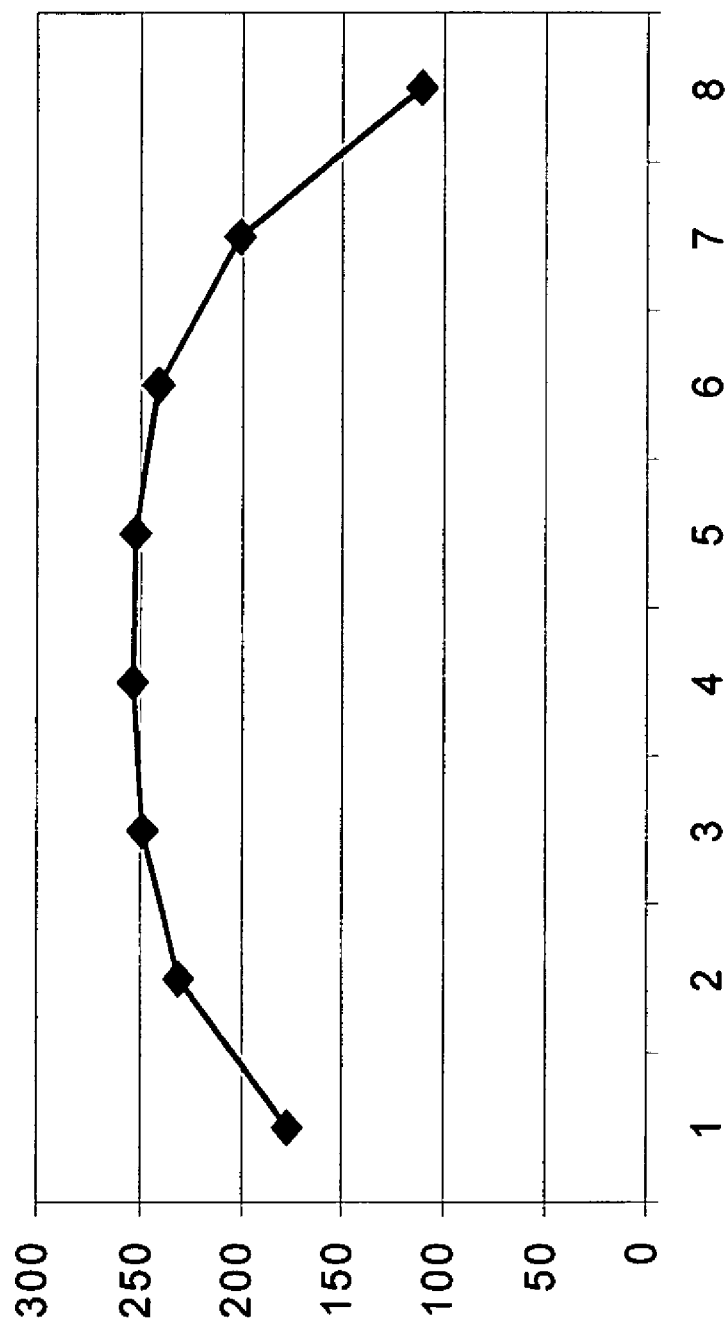
FIG. 2 is a graph showing a correlation curve for a sampling having a ½ sample timing error.

The result of the correlation process, as a function of offset within a symbol, is a "dome shaped" correlation curve similar to those shown in FIGS. 1 and 2. True synchronization (i.e., perfect timing between the demodulator's symbol sampling timing and the received signal's symbol timing) occurs at the center of the curve, where the correlation is highest. The correlation curve is relatively flat near its center, but it slopes off quickly on each side as the correlations move ½ symbol (4 samples in the example of N=8) toward the edge of the symbol that aligns with the training sequence.

FIG. 1 shows an example correlation curve for the case of "zero delay," i.e., in the case where the input signal's timing is perfect relative to the demodulator's symbol sampling clock. FIG. 2 shows an example correlation curve for the case of a "½ sample delay," i.e., in the case where the input signal is mis-timed with the demodulator's symbol sampling clock by ½ of a sample period. Although the overall shapes of the two curves are similar, the offset of each shape relative to its correlation values is different. Furthermore, the ideal synchronization time may be between two points on the graph, and an interpolation algorithm is necessary to synchronize to the ideal point.

In the present invention, the geometry of the correlation curves is exploited to determine the fractional sample timing delay necessary to improve synchronization. Various geometric interpretations of these correlation curves form the basis for algorithms which distinguish the zero-delay case from the fractional sample delay case, in order to control insertion of the fractional sample delay (a ½ sample delay, for example). The present invention uses the correlation curves to determine when to insert a fractional sample delay and to determine the necessary amount of fractional sample delay.

Part 2 of the system according to the present invention is the implementation of the fractional sample delay. For example, when a ±½ sample delay is needed, it is implemented as simply the average of every pair of incoming samples. This operation can be described as a "running average filter" or "interpolation filter." In effect, the first and second of each pair of input samples are multiplied by coefficients of 0.5 and 0.5, respectively, and the results are summed together. This example implements a fractional sample delay of ½ sample.

Figure 3:
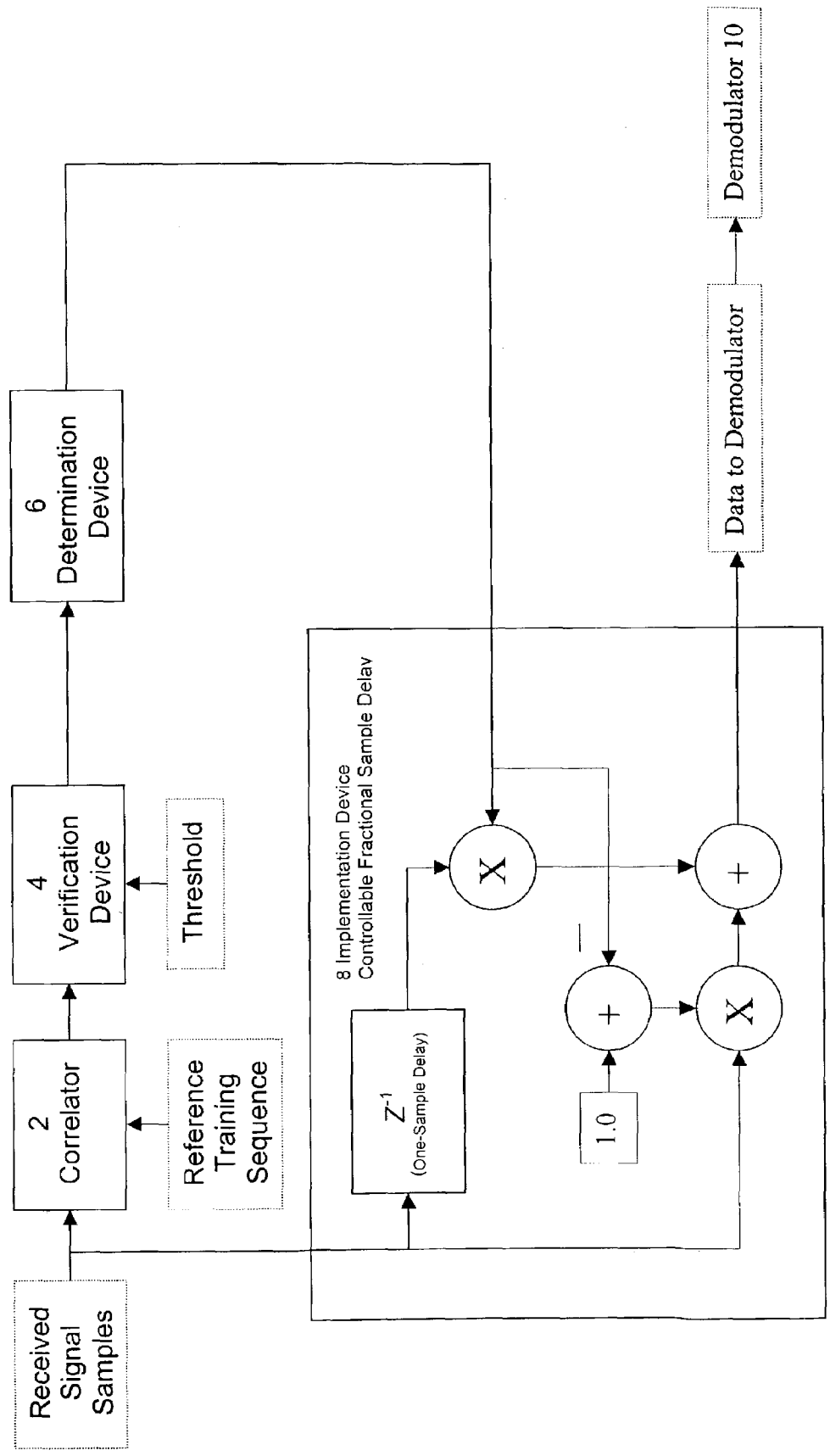
FIG. 3 is a block diagram showing a system for implementing a fractional sample delay.

FIG. 3 is a block diagram of a system for implementing a fractional sample delay according to the present invention. A correlator 2 correlates the signal samples received by a receiver with a reference training signal to produce correlation values. A verification device 4, such as a processor, selects only those correlation values that are above the threshold value. A determination device 6, such as a processor, determines if a fractional sample delay is needed and calculates the required fractional sample delay using the correlation values that exceed the threshold value. An implementation device 8 then implements the fractional sample delay, when necessary, and the data is set to a demodulating device 10, such as processor executing software or a digital or analog circuit, for demodulating.

In a literal sense, the symbol sampling timing can only be delayed by a whole sample. However, for example, a fractional sample delay can be effectively implemented by blending part of a delayed sample with part of the current sample. For a delay of "d," the previous sample is multiplied by d and summed with the current sample multiplied by (1−d), as follows:

fractional_delayed_sample=d*previous_sample+(1−d)*current_sample

The above equation works for the range of 0.0<d<1.0. However, the present invention operates in the range of −0.5 to 0.5.

To cover the case of "negative" delays (not shown in FIG. 3), the synchronization reference is simply moved ahead by one whole sample, which introduces a constant −1.0 delay. Then, positive delays (as above), are added to the −1.0 delay to cover the negative range of −0.5 to 0.0.

Figure 4:
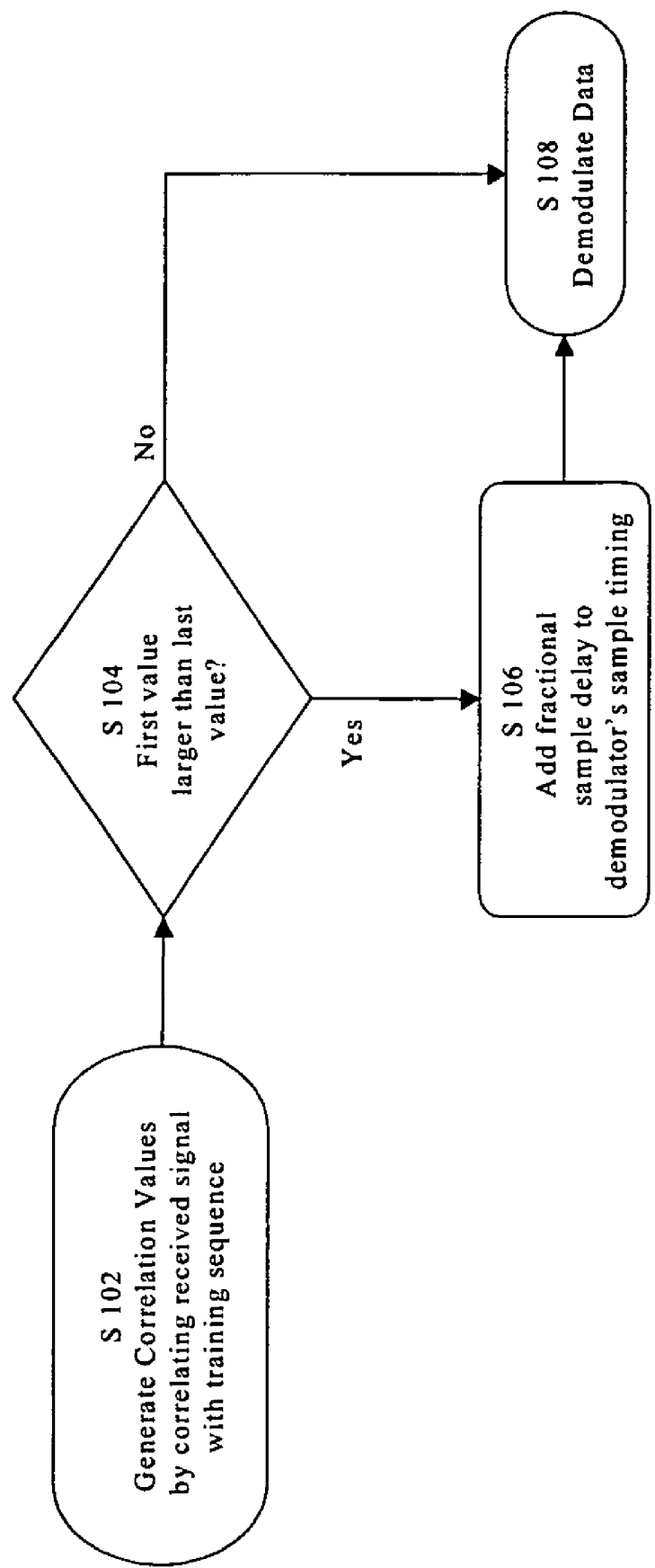
FIG. 4 is a flowchart showing the system operation according to a first embodiment of the present invention.

In a first embodiment of the present invention, the endpoints of the correlation curve are used to determine if a fractional sample delay is necessary. This embodiment will be discussed with reference to FIG. 4. First, the correlation values are generated by correlating the received signal with the reference training sequence, Step S102. Then, for all correlation values above the threshold value, the first correlation value in a sample period is compared to the last correlation value in the sample period, Step S1104. If the first correlation value is smaller than the last correlation value, then the process proceeds to Step S108 where the digital data is demodulated without the addition of a fractional sample delay. If the first correlation value is larger than the last correlation value, then the process proceeds to Step S106 where a fractional sample delay is added to the demodulator's symbol sampling timing. After adding the fractional sample delay, the digital data is demodulated in Step S108.

For example, for a threshold value of 80, an examination of the correlation curves in FIGS. 1 and 2 shows that the first correlation value is lower than the last correlation value in FIG. 1, where the demodulator's symbol sampling timing is perfectly aligned to the received signal's symbol timing. The opposite is true for the correlation curve of FIG. 2, where the demodulator's symbol sampling timing is ½ sample delayed from the received signal's symbol timing. This fact is one of the various geometric interpretations of these curves that forms the basis for algorithms which distinguish the zero-delay case from the fractional sample delay case, in order to control insertion of the fractional sample delay (½ sample in this example). In this example, when the first correlation value is lower than the last correlation value, as in FIG. 1, then a fractional sample delay is not necessary. When the first correlation value is higher than the last correlation value, as in FIG. 2, then a fractional sample delay is added to the demodulator's symbol sampling timing to better align the demodulator's symbol sampling timing with the received signal's symbol timing. The fractional sample delay increases the sampling resolution without increasing the sampling rate N.

In a second embodiment of the present invention, another geometric interpretation of the correlation curves is used to form the basis for an algorithm that distinguishes the zero-delay case from the fractional sample delay case, in order to control insertion of the fractional sample delay (½ sample, for example). In the second embodiment, the number of correlation values above a threshold value are determined. Then, a fractional sample delay is added if the determined number of correlation values above the threshold value is either odd or even, depending on the application. In experimenting with simulations, this embodiment was the most effective algorithm for implementing the method of the present invention.

Figure 5:
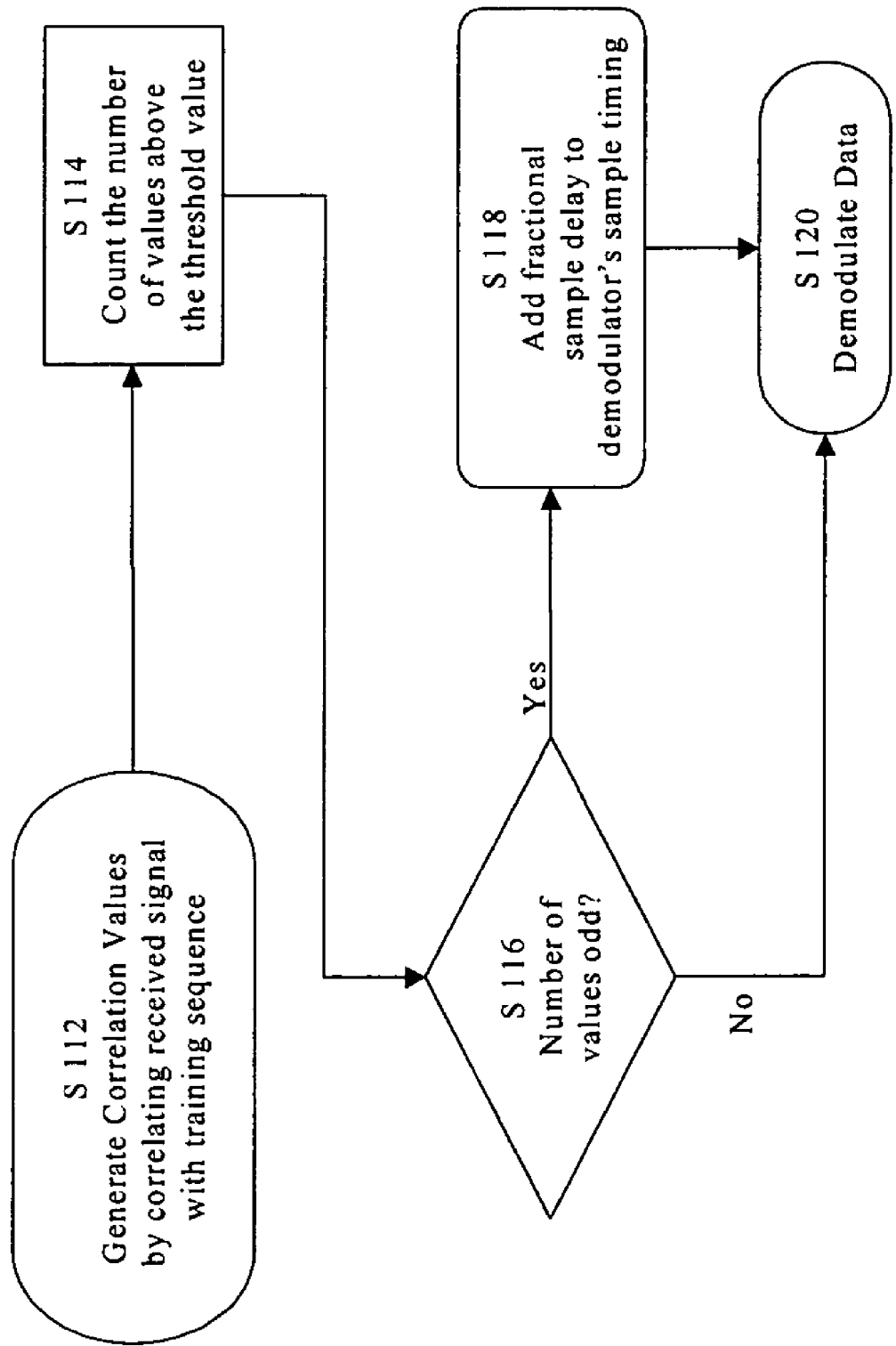
FIG. 5 is a flowchart showing the system operation according to a second embodiment of the present invention.

The second embodiment will be discussed with reference to FIG. 5. First, the correlation values are generated in step S112 by correlating the received signal with the reference training sequence. The number of correlation values per symbol period that are above the threshold value are counted in step S114. In step S116, it is determined whether the number of values counted in step S114 is odd or even. If the number of values counted in step S114 is even, then the process proceeds to step S120, and the digital data is demodulated without the addition of a fractional sample delay. If the number of values counted in step S114 is odd, then, in step S118, a fractional sample delay is added to the demodulator's symbol sampling timing before the digital data is demodulated in step S120.

For example, using a threshold value of 205, it can be determined from FIG. 1 that six of the correlation values are above the threshold value. Thus, an even number of correlation values are above the threshold value when the demodulator's symbol sampling timing is perfectly aligned with the received signal's symbol timing. FIG. 2 shows that five of the correlation values are above the threshold value of 205 when the demodulator's symbol sampling timing is ½ sample delayed from the received signal's symbol timing. Thus, an odd number of correlation values are above the threshold value when the demodulator's symbol sampling timing is ½ sample delayed with the received signal's symbol timing. Therefore, a fractional sample delay (½ sample in this example) is added when the number of correlation values above the chosen threshold value is an odd number.

Whether or not a fractional sample delay is added when the number of correlation values exceeding the threshold value is odd or even is determined by the threshold value in relation to the application's correlation curve. For certain threshold values, a fractional sample delay may be added if the number of exceeding values is odd. For other threshold values, a fractional sample delay may be added if the number of exceeding values is even. The threshold value must be determined for each application, and that threshold value determines whether the demodulator's symbol sampling timing is aligned with the received signal's symbol timing when the number of exceeding values is odd or even.

Figure 6:
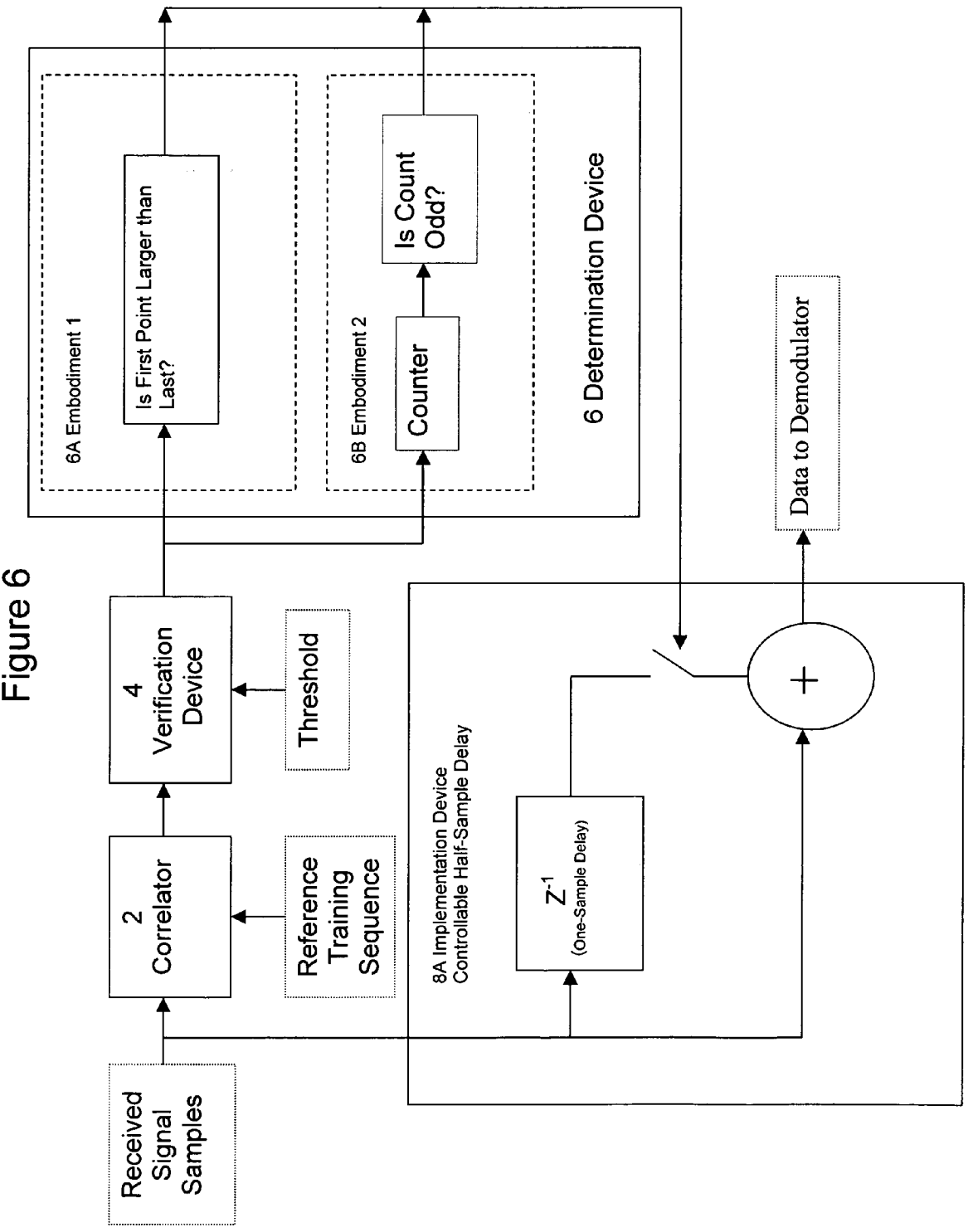
FIG. 6 is a block diagram showing a system for implementing a fractional sample delay of ½ sample.

FIG. 6 is a block diagram of a system for implementing a fractional sample delay of ½ sample according to the present invention. A correlator 2 correlates the received signal samples with a reference training signal to produce correlation values. A verification device 4, such as a processor, selects only those correlation values that are above the threshold value. In the example of this system, the determination device 6 includes items 6A and 6B corresponding to embodiments 1 and 2, discussed above. When determined by either determination device 6A or 6B that a ½ sample delay is necessary, the implementation device 8A adds the ½ sample delay to the demodulator's symbol sampling timing.

The present invention is not limited to a fractional sample delay of ½ sample. Other coefficient values may be used in the interpolation filter to implement other delay periods. For example, coefficient values of 1.0 and 0.0, respectively, implement a fractional sample delay of zero samples, and coefficient values of 0.0 and 1.0, respectively, implement a fractional sample delay of one sample. Other combinations of coefficients can be used to implement any desired fractional sample delay.

In experimenting with simulations, various algorithms to distinguish the zero and fractional sample delay cases were tested. The most effective method is to simply determine whether an even or odd number of correlation values exceeded a certain threshold value. Simulations show that in cases where a fractional sample delay of ¼ or ½ was added to the demodulator's symbol sampling timing, the performance of the simulated system was very similar to its performance with zero delay, i.e., when the demodulator's symbol sampling timing is perfectly aligned to the received signal's symbol timing. In other words, a compensated system with the fractional sample delay implemented worked as well as a simulated system with no delay.

Although the examples, along with FIGS. 1 and 2, discussed herein represent a system of the present invention that is designed to include/exclude a ½ sample delay as a mitigation for too-coarse sample timing, the basic elements of using the shape of the correlation curve to determine the fractional sample delay required, then implementing that delay with a sample interpolation method can be generalized. For example, the present invention could be extended to select and implement a ±0, ¼, or *frax;beginbold1endbold*; *beginbold2endbold* fractional sample delay, or even to calculate and implement a "continuous" range of sample delays. Any sample delay between −0.5 and 0.5 can be implemented with the present invention. A sample delay of greater than 0.5, or less than −0.5, is equivalent to a corresponding fractional sample delay between −0.5 and 0.5, after adjusting the synchronization reference sample index by one. For example, a sample delay of 0.75 is the equivalent of a −0.25 sample delay after moving the synchronization reference index back by one. In the case of a continuous fractional sample delay, the fractional sample delay determined by the algorithm is always implemented, even though that delay may be negligible. Furthermore, the present invention is not limited to the demodulator of a VDL Mode 2 receiver. Rather it can be used in any digital data demodulator which employs a training sequence.

It is preferable to use the present invention with computer hardware that performs the processing and implementing functions. As will be appreciated by those skilled in the art, the systems, methods, and procedures described herein can be embodied in a programmable computer, computer executable software, or digital or analog circuitry. The software can be stored on computer readable media, for example, on a floppy disk, RAM, ROM, a hard disk, removable media, flash memory, memory sticks, optical media, magneto-optical media, CD-ROMs, etc. The digital circuitry can include integrated circuits, gate arrays, building block logic, field programmable gate arrays (FPGA), etc.

Although specific embodiments of the present invention have been described above in detail, it will be understood that this description is merely for purposes of illustration. Various modifications of, and equivalent steps corresponding to, the disclosed aspects of the preferred embodiments, in addition to those described above, may be made by those skilled in the art without departing from the spirit of the present invention defined in the following claims, the scope of which is to be accorded the broadest interpretation so as to encompass such modifications and equivalent structures.

I claim:

1. A system for demodulating digital data, comprising:
a receiver circuit for receiving a transmitted digital data signal;
a correlator to correlate the transmitted digital data signal received from said receiver circuit with a predefined reference training sequence to produce correlation values;
a verification unit to select correlation values above a threshold value;
a determining device to determine if a fractional sample delay added to a demodulator's symbol sampling timing would improve synchronization timing and to calculate a required fractional sample delay to improve synchronization;
an implementing device implementing the calculated fractional sample delay if said determining device determines that the fractional sample delay would improve the demodulation synchronization timing; and
a demodulating device for demodulating the transmitted digital data signal outputted from said implementing device.

2. A system for demodulating digital data according to claim 1, wherein said determining device comprises an algorithm that determines if the fractional sample delay would improve the demodulation synchronization timing.

3. A system for demodulating digital data according to claim 2, wherein the algorithm comprises exploiting the geometry of a correlation curve to determine if the fractional sample delay would improve the demodulation synchronization timing.

4. A system for demodulating digital data according to claim 3, wherein the algorithm further comprises comparing first and last correlation values of the correlation curve that exceed the threshold value.

5. A system for demodulating digital data according to claim 4, wherein said determining device determines the required fractional sample delay based on the selected correlation values.

6. A system for demodulating digital data according to claim 3, wherein the algorithm further comprises counting correlation values of the correlation curve that exceed the threshold value.

7. A system for demodulating digital data according to claim 6, wherein said determining device determines the required fractional sample delay based on the selected correlation values.

8. A system for demodulating digital data according to claim 1, wherein the fractional sample delay is in the range of −0.5 to 0.5.

9. A system for demodulating digital data according to claim 8, wherein the fractional sample delay is selected from the group consisting of ±¼ and ½.

10. A system for demodulating digital data according to claim 1, wherein said implementing device comprises an interpolation filter that implements the fractional sample delay.

11. A system for demodulating digital data according to claim 10, wherein the interpolation filter includes (i) a multiplier for multiplying first and second samples of each pair of input samples by respective coefficients to obtain two fractional values, and (ii) an adder or summer for summing the fractional values.

12. A system for demodulating digital data according to claim 11, wherein said implementing device uses respective coefficients of 0.5 and 0.5 to implement a fractional sample delay of ½ sample.

13. A system for demodulating digital data according to claim 11, wherein said implementing device uses respective coefficients of 1.0 and 0.0 to implement a fractional sample delay of 0 sample.

14. A system for demodulating digital data according to claim 1, wherein said demodulator comprises a demodulator portion of a VHF Digital Link Mode 2 receiver.

15. A modulator for demodulating digital data according to claim 1, wherein said correlator receives the predefined reference training sequence at the beginning of each transmission.

16. A modulator for demodulating digital data according to claim 15, wherein the predefined reference training sequence identifies the transmitted digital data signal as a VDL Mode 2 signal.

17. A method for demodulating digital data, comprising the steps of:
receiving a digital data signal;
correlating the received digital data signal with a predefined reference training sequence to produce a correlation value;
selecting correlation values above a threshold value;
determining if a fractional sample delay added to a demodulator's symbol sampling timing would improve synchronization timing and calculating a required fractional sample delay to improve synchronization;
implementing the fractional sample delay if it is determined in said determining step that the fractional sample delay would improve the demodulation synchronization timing; and
demodulating the implemented received digital data signal.

18. A method for demodulating digital data according to claim 17, wherein said determining step comprises an algorithm that determines if the fractional sample delay would improve the demodulation synchronization timing.

19. A method for demodulating digital data according to claim 18, wherein the algorithm comprises exploiting the geometry of a correlation curve to determine in said determining step if the fractional sample delay would improve the demodulation synchronization timing.

20. A method for demodulating digital data according to claim 19, wherein the algorithm further comprises comparing first and last correlation values of the correlation curve that exceed the threshold value.

21. A method for demodulating digital data according to claim 20, wherein said determining step further determines the required fractional sample delay based on the selected correlation values.

22. A method for demodulating digital data according to claim 19, wherein the algorithm further comprises counting correlation values of the correlation curve that exceed the threshold value.

23. A method for demodulating digital data according to claim 22, wherein said determining step further determines the required fractional sample delay based on the selected correlation values.

24. A method for demodulating digital data according to claim 17, wherein the fractional sample delay is in the range of −0.5 to 0.5.

25. A method for demodulating digital data according to claim 24, wherein the fractional sample delay is selected from the group consisting of ±¼ and ½.

26. A method for demodulating digital data according to claim 17, wherein said implementing step includes an interpolation step using an interpolation filter to implement the fractional sample delay.

27. A method for demodulating digital data according to claim 26, wherein the interpolation step comprises the steps of (i) providing input samples and multiplying first and second samples of each pair of the input samples by respective coefficients to obtain two fractional values, and (ii) summing the fractional values.

28. A method for demodulating digital data according to claim 27, wherein the fractional sample delay of 0 samples sample is implemented in said implementing step by using respective coefficients of 1.0 and 0.0.

29. A method for demodulating digital data according to claim 27, wherein the fractional sample delay of ±½ sample is implemented in said implementing step by using respective coefficients of 0.5 and 0.5.

30. A method for demodulating digital data according to claim 17, wherein a VHF Digital Link Mode 2 radio receiver is provided for implementing the method.

31. A method for demodulating digital data according to claim 15, wherein a digital circuit is provided for implementing the method.

32. A method for demodulating digital data according to claim 17, wherein a process is provided for implementing the method.

33. Computer executable code stored in a computer readable medium for implementing a method for demodulating digital data, said code for executing the steps comprising:
receiving a digital data signal;
correlating the received digital data signal with a predefined reference training sequence to produce a correlation value;
selecting correlation values above a threshold value;
determining if a fractional sample delay added to a demodulator's symbol sampling timing would improve synchronization timing and calculating a required fractional sample delay to improve synchronization;

implementing the fractional sample delay if it is determined in said determining step that the fractional sample delay would improve the demodulation synchronization timing; and demodulating the implemented received digital data signal.

34. Computer executable code for implementing a method for demodulating digital data according to claim 33, wherein said determining step comprises an algorithm that determines if the fractional sample delay would improve the demodulation synchronization timing.

35. Computer executable code for implementing a method for demodulating digital data according to claim 34, wherein the algorithm comprises exploiting the geometry of a correlation curve to determine in said determining step if the fractional sample delay would improve the demodulation synchronization timing.

36. Computer executable code for implementing a method for demodulating digital data according to claim 35, wherein the algorithm further comprises comparing first and last correlation values of the correlation curve that exceed a threshold value.

37. Computer executable code for implementing a method for demodulating digital data according to claim 36, wherein said determining step further determines the required fractional sample delay based on the selected correlation values.

38. Computer executable code for implementing a method for demodulating digital data according to claim 35, wherein the algorithm further comprises counting correlation values of the correlation curve that exceed a threshold value.

39. Computer executable code for implementing a method for demodulating digital data according to claim 38, wherein said determining step further determines the required fractional sample delay based on the selected correlation values.

40. Computer executable code for implementing a method for demodulating digital data according to claim 33, wherein said implementing step includes an interpolation step using an interpolation filter to implement the fractional sample delay.

41. Computer executable code for implementing a method for demodulating digital data according to claim 40 wherein the interpolation step comprises the steps of (i) multiplying first and second samples of each pair of input samples by respective coefficients to obtain two fractional values, and (ii) summing the fractional values.

42. A method for demodulating digital data, comprising the steps of:

receiving a digital data signal;

correlating the received digital data signal with a predefined reference training sequence to produce a correlation value;

selecting correlation values above a threshold value;

determining an amount of fractional sample delay to be added to a demodulator's symbol sampling timing based on the selected correlation values;

implementing the amount of fractional sample delay; and demodulating the implemented received digital data signal.

43. A demodulator for demodulating digital data, comprising:

receiving means for receiving a digital data signal;

correlating means for correlating the digital data signal received from said receiving means with a predefined reference training sequence to produce a correlation value;

verification means to select correlation values above a threshold value;

determining means for determining an amount of a fractional sample delay to be added to a demodulator's symbol sampling timing based on the selected correlation values;

implementing means for implementing the amount of fractional sample delay; and demodulating means for demodulating the digital data signal outputted from said implementing means.

* * * * *